(12) United States Patent
Dave et al.

(10) Patent No.: US 9,609,409 B2
(45) Date of Patent: *Mar. 28, 2017

(54) USE OF AN EARPIECE ACOUSTIC OPENING AS A MICROPHONE PORT FOR BEAMFORMING APPLICATIONS

(71) Applicant: Apple Inc., Cupertino, CA (US)

(72) Inventors: Ruchir M. Dave, San Jose, CA (US); Jae H. Lee, San Jose, CA (US); Guy C. Nicholson, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/625,503

(22) Filed: Feb. 18, 2015

(65) Prior Publication Data

US 2015/0163578 A1    Jun. 11, 2015

Related U.S. Application Data

(63) Continuation of application No. 13/652,997, filed on Oct. 16, 2012, now Pat. No. 8,988,480.

(Continued)

(51) Int. Cl.
*H04R 1/08* (2006.01)
*H04M 1/03* (2006.01)
(Continued)

(52) U.S. Cl.
CPC ............. *H04R 1/08* (2013.01); *H04M 1/03* (2013.01); *H04N 7/15* (2013.01); *H04R 1/02* (2013.01); *H04R 3/005* (2013.01); *H04M 1/6041* (2013.01); *H04M 2250/52* (2013.01); *H04R 1/406* (2013.01); *H04R 2499/11* (2013.01)

(58) Field of Classification Search
CPC   H04N 7/15; H04N 7/14; H04N 7/141; H04N 7/142; H04R 1/02; H04R 1/08; H04R 3/005; H04R 1/6041; H04R 1/406; H04R 2499/11; H04M 1/03; H04M 2250/52
USPC ............. 348/14.01–14.02; 455/575.1, 575.3, 455/575.4
See application file for complete search history.

(56) References Cited

U.S. PATENT DOCUMENTS 5,210,793 A    5/1993   Carlson et al.
8,194,880 B2   6/2012   Avendano
(Continued)

OTHER PUBLICATIONS

International Preliminary Report on Patentability & Written Opinion of the ISA in PCT Application No. US/2013/055753. 8 pages.
(Continued)

*Primary Examiner* — Melur Ramakrishnaiah
(74) *Attorney, Agent, or Firm* — Blakely, Sokoloff, Taylor & Zafman LLP

(57) ABSTRACT

A mobile multi-function device that includes a speaker, two or more microphones, and a beamformer processor is described. The beamformer processor uses the microphones to perform beamforming operations. One of the microphones shares a receiver acoustic opening with the speaker while the other microphone uses a separate acoustic opening. The receiver acoustic opening may be an earpiece opening that is held to the ear of a user while conducting a phone call with the device and provides acoustic input and output paths for the microphone and the speaker, respectively.

12 Claims, 4 Drawing Sheets

Related U.S. Application Data

(60) Provisional application No. 61/698,907, filed on Sep. 10, 2012.

(51) Int. Cl.
    *H04R 3/00*     (2006.01)
    *H04N 7/15*     (2006.01)
    *H04R 1/02*     (2006.01)
    *H04M 1/60*     (2006.01)
    *H04R 1/40*     (2006.01)

(56) References Cited

U.S. PATENT DOCUMENTS

| | | |
|---|---|---|
| 8,194,882 B2 | 6/2012 | Every et al. |
| 8,451,312 B2 | 5/2013 | Lee et al. |
| 2009/0175466 A1 | 7/2009 | Elko et al. |
| 2010/0046771 A1* | 2/2010 | Gregg .................. H04R 1/02 381/98 |
| 2010/0081487 A1 | 4/2010 | Chen et al. |
| 2010/0195838 A1 | 8/2010 | Bright |
| 2011/0317041 A1 | 12/2011 | Zurek et al. |
| 2012/0051548 A1* | 3/2012 | Visser .................. G10L 21/0208 381/56 |
| 2013/0016854 A1* | 1/2013 | Zheng .................. H04R 3/005 381/94.7 |

OTHER PUBLICATIONS

PCT International Search Report and Written Opinion of the International Search Authority in PCT/US2013/055753, dated Nov. 8, 2013. 12 pages.

* cited by examiner

USE OF AN EARPIECE ACOUSTIC OPENING AS A MICROPHONE PORT FOR BEAMFORMING APPLICATIONS

CROSS-REFERENCE TO RELATED APPLICATION

This application is a continuation of U.S. application Ser. No. 13/652,997, filed Oct. 16, 2012, which claims the benefit of the earlier filing date of provisional Application No. 61/698,907, filed Sep. 10, 2012.

FIELD

An embodiment relates to a mobile multi-function device that includes a first microphone and a receiver speaker that use the same acoustic opening for acoustic input and output. The first microphone is used along with a second microphone for beamforming applications. Other embodiments are also described.

BACKGROUND

Mobile multi-function devices often include multiple microphones. The microphones may be used for a variety of functions, including placing phone calls and receiving voice commands. The use of multiple microphones may allow for a user or target audio source to be clearly heard when located in a variety of locations relative to the mobile multi-function device. For example, separate microphones may be located on the back and the front of the device such that audio in front or in back of the device may be clearly sensed by a respective microphone.

Although multiple microphones are useful, each microphone requires a separate hole or acoustic opening in the housing of the mobile multi-function device such that the microphones are exposed to the outside environment and allow the microphones to pick-up corresponding sounds. However, although multiple microphones are useful, forming a new opening in the housing for each microphone is aesthetically unappealing and adds additional complications in the design and construction of the housing.

SUMMARY

A mobile multi-function device that includes a speaker, two or more microphones, and a beamformer processor is described. The beamformer processor uses the microphones to perform beamforming operations. One of the microphones shares a receiver acoustic opening with the speaker while the other microphone uses a separate acoustic opening. The receiver acoustic opening may be an earpiece opening that is held to the ear of a user while conducting a phone call with the device and provides acoustic input and output paths for the microphone and the speaker, respectively. In this embodiment, the receiver acoustic opening is located on a top portion of the front face of the device.

Since the speaker and the first microphone share the receiver acoustic opening, a dedicated acoustic opening is not needed for the first microphone. The lack of another acoustic opening in the housing of the device is both aesthetically pleasing and provides for a less complicated design and manufacturing process. Additionally, by using the receiver acoustic opening, which is located on a top portion of the device, the microphone will be unobstructed by the hand of a user while performing video conferencing, voice dictation, voice activation, or similar operations in which the user is speaking while holding the device away from his face The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments are described with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
FIG. 1 shows a human user holding a mobile multi-function device, namely a smart phone.

FIG. 1 shows a mobile multi-function device 1 (also referred to here as a mobile communications device or a mobile multi-function communications device) held in the hands of an end user (owner) of the device 1. The mobile multi-function device 1 is a portable, personal apparatus that may be held in the hand and carried by a user during operation. In one instance, the device 1 is a smart phone or a cellular phone with several features typically available in modern wireless communication devices, such as a touch screen interface, music, video file recording, playback, digital camera, voice dictation/commands, and wireless-enabled applications such as voice over internet protocol telephony, video conferencing, electronic calendar, web browser, and email. In another instance, the device 1 may be a larger, tablet-like computer such as an iPad™ device or a laptop notebook such as a MacBook™ device by Apple Inc.

Figure 2:
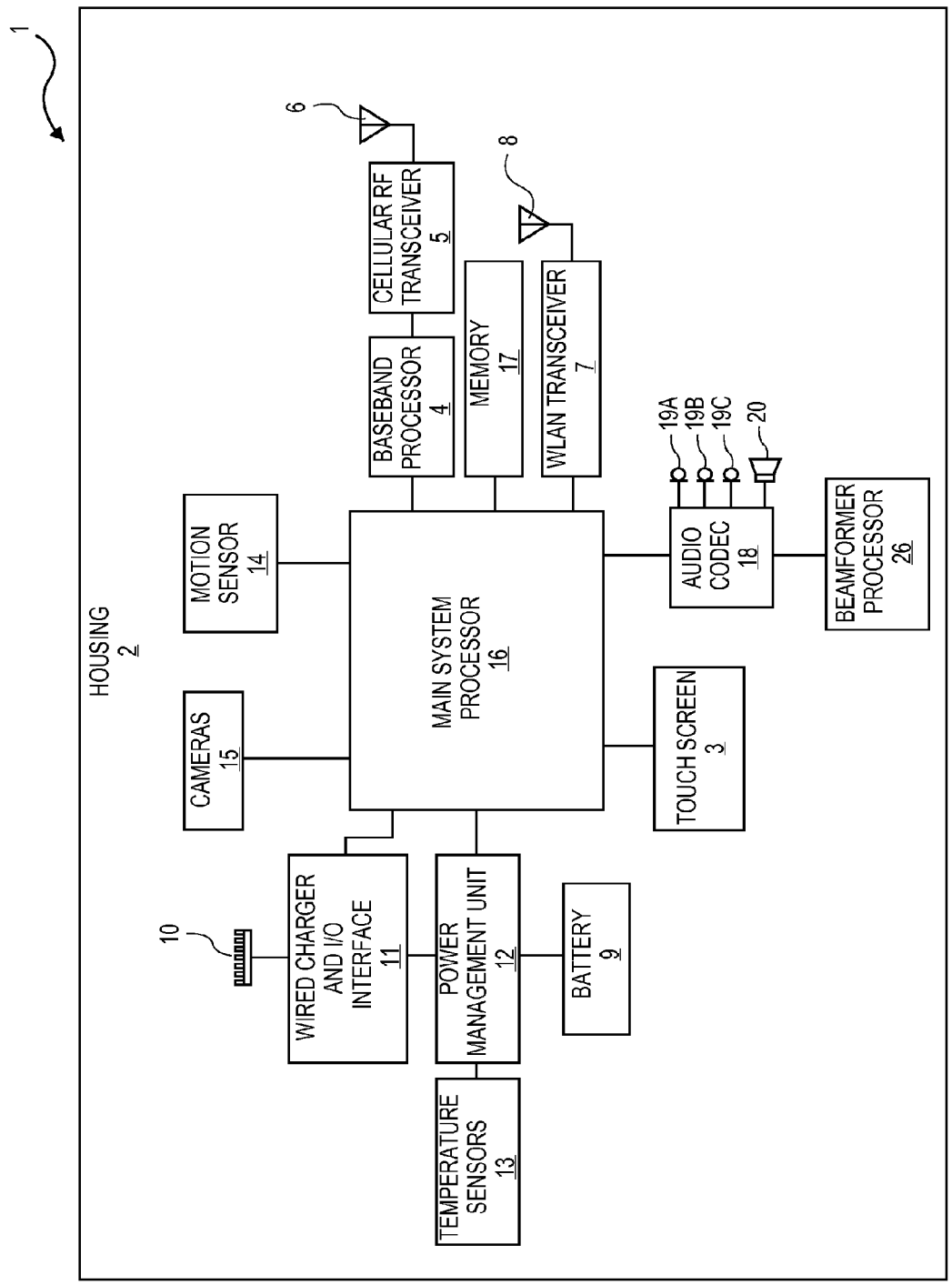
FIG. 2 is a block diagram of the constituent functional unit blocks and hardware components in an example mobile multi-function device with three microphones.

FIG. 2 shows a functional unit block diagram and some constituent hardware components of the mobile multi-function device 1, e.g. as found in an iPhone™ device by Apple Inc. The device 1 has a housing 2 in which the primary mechanism for visual and tactile interaction with its user is a touch sensitive display screen (referred to here as a touch screen) 3. The housing 2 may be essentially a solid volume referred to as candy bar or chocolate bar type as in the iPhone™ device. An alternative is one that has a moveable, multi-piece housing 2, such as a clamshell design, or one with a sliding, physical keypad as used by other cellular and mobile handset or smart phone manufacturers. The touch screen 3 is used to display typical features of visual voicemail, web browser, email, and digital camera viewfinder, as well as others, and to receive input from the user via virtual buttons and touch commands.

For wireless telephony, a baseband processor 4 is included to perform speech coding and decoding functions upon the uplink and downlink signals, respectively, in accordance with the specifications of a given protocol, e.g. cellular GSM, cellular CDMA, wireless VOIP. A cellular RF transceiver 5 receives the coded uplink signal from the baseband processor 4 and up converts it to a carrier band before driving an antenna 6 with it; it receives a downlink signal from the antenna 6 and down converts the signal to baseband before passing it to the baseband processor 4. A wireless local area network transceiver 7 receives and transmits data packets from a nearby wireless router or access point, using an antenna 8.

Power is provided to operate the components shown in FIG. 2 by a battery 9 (generically used here to refer to a rechargeable power source that may also include a rechargeable fuel cell). The battery 9 is charged or replenished by an external power source such as a wall plug or automobile battery dc power adapter (not shown) that connects to a multi-pin docking connector 10 that is also integrated in the housing 2 of the device 1. The connector 10 and its associated charger and I/O interface circuitry 11 may be in accordance with any suitable computer peripheral specification such as Universal Serial Bus (USB). The USB protocol allows for the connector 10 and its associated interface 11 to be used for both power transfer to recharge the battery 9 and for data I/O communications. The latter includes docking functions, to synchronize user content in the device 1 with another computer device owned by the user that may have substantially more data storage capacity, e.g. a desktop computer, a laptop/notebook computer.

The mobile multi-function device 1 may include a power management unit (PMU) 12. The PMU 12 is typically implemented as a programmed processor, with associated analog and digital conversion circuitry, analog signal conditioning circuitry, and a data communications interface needed to control or communicate with other components of the device 1 (for purposes of thermal management). The PMU 12 obtains temperature data (or temperature readings) from multiple temperature sensors 13, and then processes that data to make decisions that affect power consumption activity, in order to maintain specified thermal levels for the device 1. The PMU 12 may include power supply circuitry with various regulated voltage outputs for supplying power to the components of the device 1. The PMU 12 may also be tasked with the orderly powering down and powering up the various components of the device 1, in response to system reset or the main power on/off switch being actuated by the user.

The device 1 may also include a motion sensor 14 which may use an accelerometer to measure linear acceleration of the device 1 along a given axis. The motion sensor 14 may use a MEMS type mechanical sensor or gyroscope to measure turn rate or angular velocity of the device 1 about a given axis.

The device 1 may also include one or more cameras 15 integrated into the housing 2. The cameras 15 may be any camera type suitable for being integrated in a mobile device, including Complementary metal-oxide-semiconductor (CMOS) cameras. The cameras 15 may be separately located on front and rear faces of the device 1 and accordingly directed at respective front and rear areas of the device 1 such that a corresponding application running on the device 1 may use one or both of the captured scenes.

The user-level functions of the device 1 are implemented under control of a processor 16 that has been programmed in accordance with instructions (code and data) stored in memory 17. The processor 16 and memory 14 are generically used here to refer to any suitable combination of programmable data processing components and data storage that conduct the operations needed to implement the various functions of the device 1. The processor 16 may be an applications processor typically found in a smart phone, while the memory 17 may refer to microelectronic, non-volatile random access memory. An operating system may be stored in the memory 17, along with application programs specific to the various functions of the device 1, which are to be run or executed by the processor 16 to perform the various functions of the device 1. For instance, there may be a telephony application that (when launched, unsuspended, or brought to foreground) enables the user to "dial" a telephone number to initiate a telephone call using a wireless VOIP or a cellular protocol and to "hang up" on the call when finished. Additionally, the processor 16 may run other applications, including a multimedia/video call application (such as provided by FaceTime™ developed by Apple Inc.), a voice dictation/activation application (such as provided by Siri™ developed by Apple Inc.), and a video recording application.

The device 1 may include an audio codec 18 for coding or decoding a data stream or signal. The audio codec 18 may receive inputs signals from one or more microphones 19 and output signals to a speaker 20. Conversion between analog domain and digital domain for the speaker and microphone signals, in addition to digital audio signal processing for different applications running on the device 1, may be performed within the audio codec 18. A physical volume switch or button may also be connected to the codec 18. The codec 18 may be configured to operate in different modes, e.g. to service a digital media player function (such as an MP3 player that is playing back a music file that is stored in the device 1), as well as a wireless telephony function.

The speaker 20 may be any type of electroacoustic transducer that produces sound in response to an electrical audio signal input. For example, the speaker 20 may use a lightweight diaphragm, or cone, connected to a rigid basket, or frame, via a flexible suspension that constrains a coil of wire (e.g. a voice coil) to move axially through a cylindrical magnetic gap. When an electrical audio signal is applied to the voice coil, a magnetic field is created by the electric current in the voice coil, making it a variable electromagnet. The coil and the speaker's 20 magnetic system interact, generating a mechanical force that causes the coil (and thus, the attached cone) to move back and forth, thereby reproducing sound under the control of the applied electrical audio signal coming from a source, such as the audio codec 18. Although described as including a single speaker 20, the device 1 may alternatively include multiple speakers 20 driven in a similar fashion as described above.

Figure 3A:
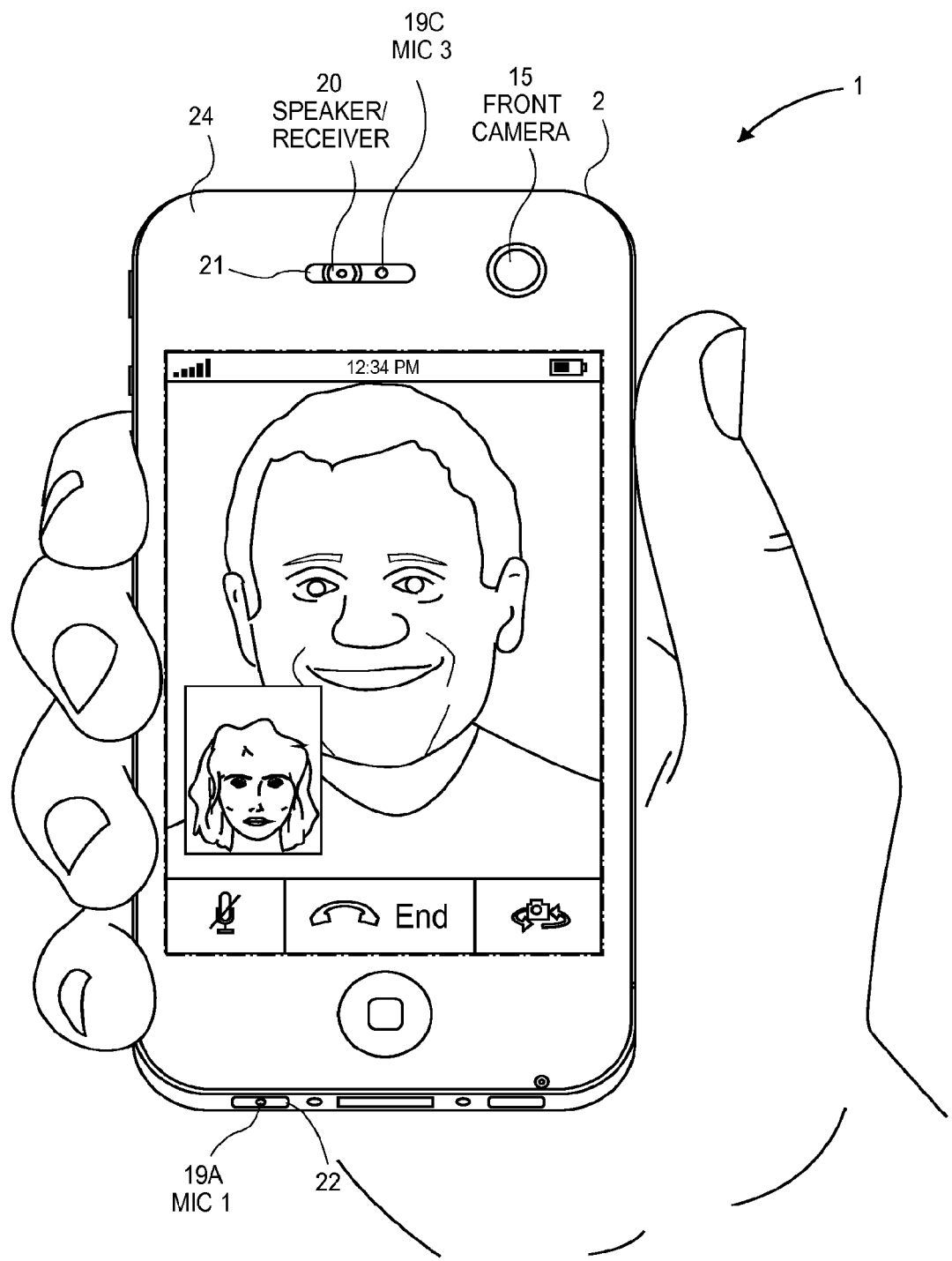
FIG. 3A is a view of the front face of the device while the device is running a video conferencing application.

As shown in FIG. 3A, the speaker 20 uses a first acoustic opening 21 as an acoustic path or output port to expose the speaker 20 to the area surrounding the device 1. The first acoustic opening 21 is located on an upper portion of a front face or surface 24 of the device 1. As used herein in, the front face 24 is the side the device 1 that includes access for the user to the touch screen 3. The first acoustic opening 21 may be a receiver or earpiece opening that is held to the ear of a user while conducting a phone call with the device 1. The first acoustic opening 21 may be a slot or a hole in the housing 2 that allows sound produced by the speaker 20 to emanate into a room or into the ear canal of a user. As shown in FIG. 3A, the first acoustic opening 21 is elliptical. In other embodiments, the first acoustic opening 21 may be rectangular or formed from a set of small holes. The first acoustic opening 21 may be drilled or otherwise formed in the housing 2 during manufacturing of the device 1. In one embodiment, the first acoustic opening 21 includes a grille or a grating that shields the speaker 20 from foreign objects and unduly high pressure that may damage the speaker 20.

The microphones 19 may be any type of acoustic-to-electric transducer or sensor, including MicroElectrical-Mechanical System (MEMS) microphones, piezoelectric microphones, electret condenser microphones, or dynamic microphones. The microphones 19 may be situated in different areas of the device 1 as described in more detail below.

In one embodiment, a first microphone 19A is located along a bottom side of the device 1. The first microphone 19A may be primarily used during voice calls to receive audio from a user of the device 1 while the user has the device 1 up to his ear. The housing 2 may include a second acoustic opening or hole 22 that the microphone 19A uses as an acoustic path or input port to expose the first microphone 19A to the area surrounding the device 1. The second acoustic opening may be drilled or otherwise formed in the bottom side of the housing 2 during manufacturing of the device 1.

Figure 3B:
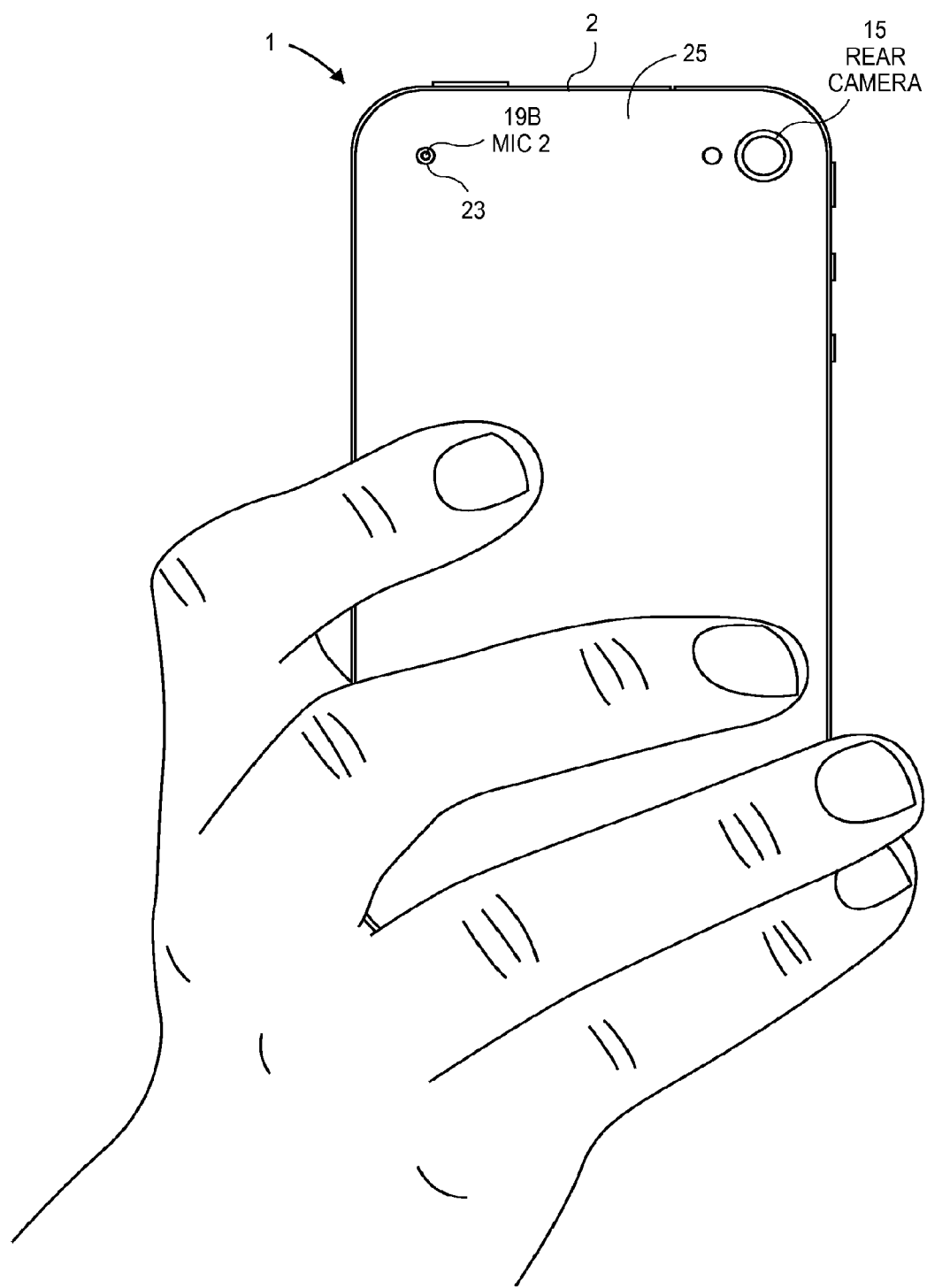
FIG. 3B is a view of the rear face of the device.

As shown in FIG. 3B, in one embodiment a second microphone 19B is located along a rear face or surface 25 of the device 1. The second microphone 19B may be used for beamforming operations as will be described in further detail below. The housing 2 may include a third acoustic opening 23 or hole that the microphone 19B uses as an acoustic path or input port to expose the second microphone 19B to the area surrounding the device 1. The third acoustic opening 23 may be drilled or otherwise formed in the housing 2 during manufacturing of the device 1.

In one embodiment, a third microphone 19C is located on the front face 24 of the housing 2 as shown in FIG. 3A. The third microphone 19C may be used along with the second microphone 19B for beamforming operations performed by a beamformer processor 26 as will be described in further detail below.

In one embodiment, the third microphone 19C shares the first acoustic opening 21 with the speaker 20 such that the third microphone 19C is exposed to the area surrounding the device 1 through the acoustic path or port provided by the first acoustic opening 21. In one embodiment, the third microphone 19C is a microphone array with two or more transducers located in the first acoustic opening 21. Since the third microphone 19C and the speaker 20 share the first acoustic opening 21, a dedicated acoustic opening is not needed for the third microphone 19C in the housing 2 of the device 1. The lack of another acoustic opening in the housing 2 is both aesthetically pleasing and provides for a less complicated design and manufacturing process.

Additionally, by being located in the first acoustic opening 21, which is located on a top portion of the device 1, the microphone 19C will be unobstructed by the hand of a user while performing video conferencing, voice dictation, voice activation, or similar operations in which the user is speaking while holding the device 1 away from his face. For example, during a video conference, as shown in FIG. 3A, a user typically grips a bottom portion of the device 1 such that the camera 15 is framing the user. In this scenario, the user's hand might be blocking the microphone 19A which is located along the bottom side of the device 1, while the microphone 19B is facing away from the user along the rear face 25 of the device 1. However, the third microphone 19C is unobstructed and can pick up the speech from the user.

Turning now to the processing of signals produced by the microphones 19, the beamformer processor 26 will now be described. The beamformer processor 26 receives inputs from two or more microphones 19 in the device 1 and performs audio beamforming operations. Audio beamforming is a technique in which sounds received from two or more microphones are combined to enable the preferential capture of sound coming from certain directions. The beamformer processor 26 may combine the signals captured by microphone 19B and microphone 19C to generate a single output to isolate a sound from background noise. For example, in delay sum beamforming each of the microphones 19B and 19C independently receive/sense a sound and convert the sensed sound into correspond sound signals. The received sound signals are summed to determine the sound's directional angle. The maximum output amplitude is achieved when the sound originates from a source perpendicular to the array. That is, when the sound source is perpendicular to the array, the sounds will all arrive at the same time at each of the microphones 19B and 19C and are therefore highly correlated. However, if the sound source is non-perpendicular to the array, the sounds will arrive at different times and will therefore be less correlated, which will result in a lesser output amplitude. The output amplitude of various sounds makes it possible to identify background sounds that are arriving from a direction different from the direction of the sound of interest. Based on the identification of background or noise sounds, the beamformer processor 26 performs directed reception of desired sounds. For example, the beamformer processor 26 may use the inputs received from the microphones 19B and 19C to produce a variety of audio beamforming spatial directivity response patterns, including cardioid, hyper-cardioid, and sub-cardioid patterns. The patterns can be fixed or adapted over time, and may even vary by frequency.

In one embodiment, the beamformer processor 26 is purely implemented as a set of hardware circuits, state machines, digital filter blocks, and processors. In another embodiment, the beamformer processor 26 is implemented in software and run by the main system processor 16 after being accessed from the memory 17. In another embodiment, the beamformer processor 26 is implemented using a combination of hardware elements (e.g. hardware circuits, state machines, and digital filter blocks) and software run by the main system processor 16 after being accessed from the memory 17.

In one embodiment, the beamformer processor 26 may be used to generate a directivity pattern to capture sounds along the front face 24 of the device 1 during a traditional audio-only call, a multimedia/video call (such as provided by FaceTime™ developed by Apple Inc.) or a voice dictation/activation operation (such as provided by Siri™ developed by Apple Inc.). In another embodiment, the beamformer processor 26 may be used to generate a directivity pattern to capture sounds along the rear face 25 of the device 1 during a video capture operation performed using a camera 15 on the rear face 25 of the device 1.

As explained above, an embodiment of the invention may be a machine-readable medium (such as microelectronic memory) having stored thereon instructions, which program one or more data processing components (generically referred to here as a "processor") to perform beamforming operations described above. In other embodiments, some of these operations might be performed by specific hardware components that contain hardwired logic (e.g., dedicated state machines). Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A mobile device, comprising:
a mobile multi-function handset device housing that contains:
  a speaker to produce sound for an audio application that is to execute in the mobile device;
  first, second, and third microphones for capturing audio proximate to the mobile multi-function handset device housing;
  a programmed processor configured to execute a plurality of applications, including (1) a telephony application, (2) a multimedia/video call application, (3) a voice dictation/activation application, or (4) a video recording application; and
  a beamformer processor for performing directional signal reception of audio using the first and second microphones during performance of at least one of the plurality of applications,
where the housing has a first acoustic opening located on a front face and at a top end of the housing, and designed to be held to an ear of a user when the device is being used like a telephone handset during a phone call, the first acoustic opening to provide shared acoustic input and output paths for the first microphone and the speaker,
wherein the housing further includes a second acoustic opening located on a rear face and at the top end of the housing that is used by the second microphone as an input acoustic port,
wherein the housing further includes a third acoustic opening located on a bottom side of the housing that is near the mouth of the user when the device is being used like a telephone handset during the phone call, wherein the third acoustic opening is used by the third microphone as an input acoustic port.

2. The mobile device of claim 1, wherein the first acoustic opening is an ear piece receiver opening.

3. The mobile device of claim 1, wherein the beamformer processor generates a reception beam directed at an area along the front face of the mobile device while the mobile device is held away from the ear of the user.

4. The mobile device of claim 1, wherein the beamformer processor generates a reception beam directed at an area along the rear face of the mobile device.

5. A method for operating a mobile multi-function device, comprising:

running an application on the mobile multi-function device, wherein the mobile multi-function device includes a first microphone and a speaker located in a first acoustic opening on a front face and top end of the mobile multi-function device such that the first acoustic opening is designed to be held to an ear of a user during a phone call, wherein the mobile multi-function device includes a second microphone located in a second acoustic opening on a rear face and the top end of the mobile multi-function device, and wherein the mobile multi-function device further includes a third microphone located in a third acoustic opening on a bottom side of the mobile multi-function device; and
performing beamforming operations while the application is running using the first microphone installed in the first acoustic opening of the mobile multi-function device and the second microphone installed in the second acoustic opening.

6. The method of claim 5, wherein the first opening is an ear piece receiver opening.

7. The method of claim 5, wherein performing the beamforming operations includes generating a reception beam directed at an area along the front face of the device.

8. The method of claim 5, wherein the application is one of (1) a telephony application, (2) a multimedia/video call application, (3) a voice dictation/activation application, and (4) a video recording application.

9. A method for constructing a mobile multi-function device, comprising:
forming a speaker opening on a front face and top end of a housing of the mobile multi-function device;
installing a first microphone and a speaker to use the speaker opening as an acoustic input and output port;
forming a first microphone opening on a rear face and the top end of the housing of the mobile multi-function device;
installing a second microphone to use the first microphone opening as an acoustic input port;
forming a second microphone opening on a bottom side of the housing of the mobile multi-function device;
installing a third microphone to use the second microphone opening as an acoustic input port and
configuring a beamformer processor in the mobile multi-function device to perform directional signal reception of sound using the first and second microphones while the mobile multi-function device is running an application.

10. The method of claim 9, wherein the speaker opening is an ear piece receiver opening designed to be held to the ear of a user during a phone call.

11. The method of claim 9, wherein the beamformer processor is configured to generate a reception beam directed at an area along the front face of the device while the mobile multi-function device is held away from the ear of a user.

12. The method of claim 9, wherein the application is one of (1) a telephony application, (2) a multimedia/video call application, (3) a voice dictation/activation application, and (4) a video recording application.

* * * * *